Figure 1:
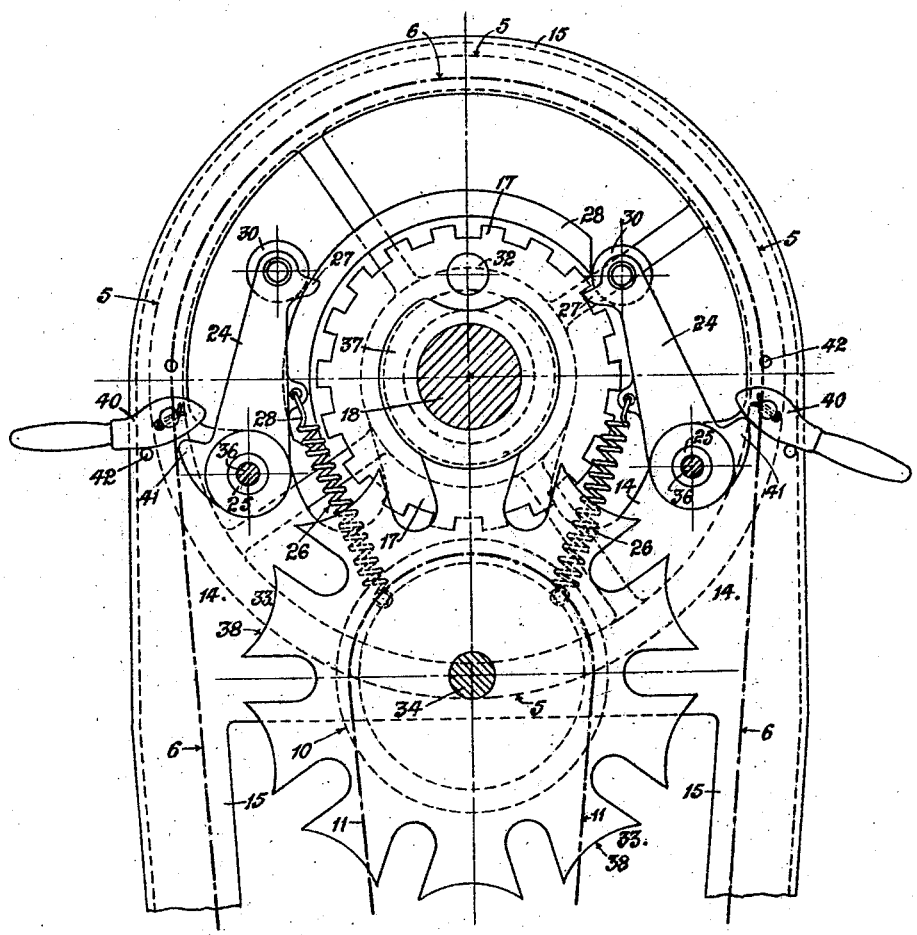

J. R. CLAY.
SHIP'S STEERING GEAR.
APPLICATION FILED JULY 9, 1920.

1,408,929.

Patented Mar. 7, 1922.
3 SHEETS—SHEET 1.

Inventor
J. R. Clay
by
Att'y

J. R. CLAY.
SHIP'S STEERING GEAR.
APPLICATION FILED JULY 9, 1920.
1,408,929.
Patented Mar. 7, 1922.
3 SHEETS—SHEET 2.
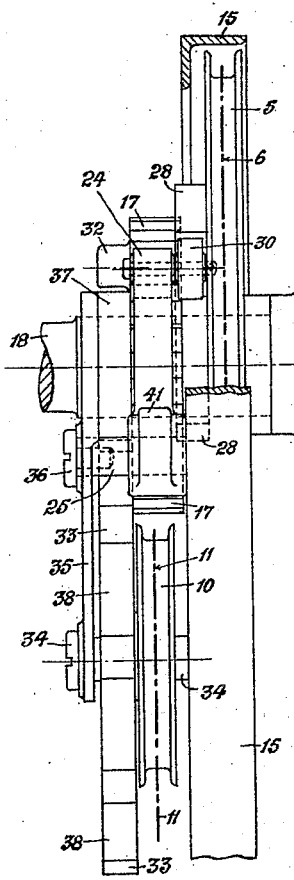
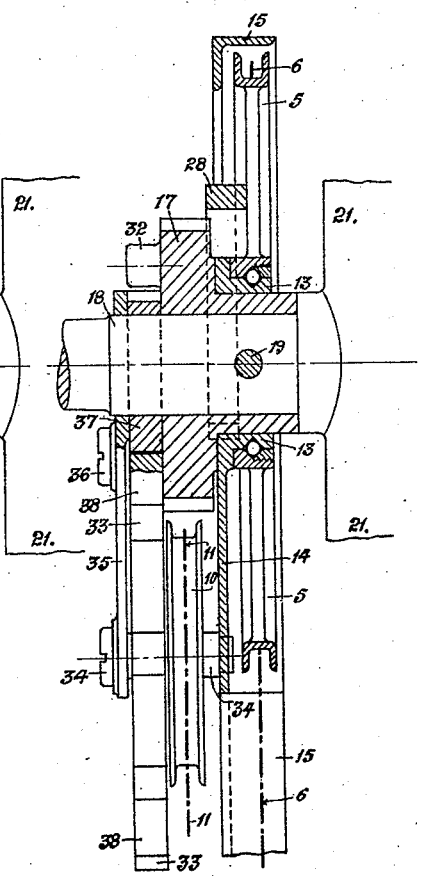
Inventor
J. R. Clay
by
Att'y.

J. R. CLAY.
SHIP'S STEERING GEAR.
APPLICATION FILED JULY 9, 1920.

1,408,929.

Patented Mar. 7, 1922.
3 SHEETS—SHEET 3.

Inventor
J. R. Clay
by
Atty

UNITED STATES PATENT OFFICE.

JAMES RICHARD CLAY, OF BLUNDELLSANDS, ENGLAND.

SHIP'S STEERING GEAR.

1,408,929. Specification of Letters Patent. Patented Mar. 7, 1922.

Application filed July 9, 1920. Serial No. 394,978.

(GRANTED UNDER THE PROVISIONS OF THE ACT OF MARCH 3, 1921, 41 STAT. L., 1313.)

*To all whom it may concern:*

Be it known, that I, JAMES RICHARD CLAY, a subject of the King of England, and residing at Blundellsands, in the county of Lancaster, England, have invented Improvements Connected with Ships' Steering Gears, of which the following is a specification.

This invention has reference to mechanism or machinery used on board ship for steering the ship, in which a locking means or mechanism, operated by the man in charge of the navigation of the ship is employed in connection with the part of the gear operated by the quartermaster, so that the steering gear (which generally is near the bridge or other place of command, whilst the steering engine or machinery proper is near the stern of the ship) is prevented from being moved a way contrary to that received on the steering telegraph receiving instrument from the man in charge, so that mishaps are prevented from taking place by the orders sent, not being carried out.

One of the objects and effects of the present invention is to provide means in addition to the safety mechanisms of the above type by which further safety is furnished and further protection is afforded against mishaps due to the mistaken performance or non-performance by the quartermaster, of the directions or orders transmitted to him from the bridge or other place of command; whilst a further object is to simplify and improve mechanism or apparatus of the kind referred to, employed in connection with the part of the gear operated by the quartermaster.

In steering gear of the kind to which this invention and type of mechanism is applicable, there is employed a hand-steering wheel, which operates the valve or controlling means of the steering engines, which may be assumed to be near the stern of the ship, while this steering wheel portion of the mechanism is generally in the wheel house; and generally, the wheel is mounted on a column fixed on the deck, having motion transmission gear in it, which extends to the steering engine or mechanism, and operates the valve or controlling means of the steering engine or machinery as stated; and between this steering wheel and the motion transmission gearing, there is introduced the locking means of the character specified, by which the wheel is prevented from being moved in the way contrary to the direction or order received from the steering telegraphic apparatus, and which is indicated on the receiving instrument adjacent to the quartermaster's gear.

In the present apparatus or mechanism, there is combined with this locking means or mechanism, a tell-tale telegraphic apparatus consisting of a motion transmission means connected with and worked by the locking means or mechanism, and an indicating pointer or means which will be in view of the operator of the transmitting instrument of the steering gear telegraph, whereby when a helm order or communication is transmitted to the receiving instrument or indicator, there will be shown or indicated on the telegraph transmitting instrument whether the precise operation required to be performed by the quartermaster has actually been performed by him; and it will also be shown exactly, the actual operations of the wheel and thereby the steering gear. Preferably, this automatic tell-tale indicating means is combined with the steering telegraph transmitter instrument; and a simple and convenient form of indicating means may consist of a pointer coincident with the axis of the telegraph transmission handle, which is operated by the operator of the telegraph.

In the case of telegraphs being of the electric light kind, indications may be effected by a series of electric lamps, which will be put in and out of illumination by the movement of the wheel and the locking mechanism or means; while in the case of moving parts of the telegraph apparatus being operated by electric current, the connections between the different instruments will consist of electric conductors.

With regard to the locking means or mechanism, this comprises a notched or toothed wheel fixed on the wheel spindle; two pawls, one on either side, pivoted to a casing of the gearing or mechanism and pressed by springs—say in tension—towards the notch or tooth wheel; a motion wheel or the like operated from the transmitter of the telegraph operated by the commander or other; and a cam carried by the said wheel or the like, and operating in connection with the pawls or rollers on the ends of them, whereby when the wheel or the like is revolved by the telegraph, the cam piece will allow one of the pawls to engage with the notch wheel, the other being kept out; and thus according to which pawl is in gear with the notch wheel, so will be alone permitted the direction in which the steering gear hand wheel is desired to be moved.

This cam device may consist of a bar or rib extending in a circular form partly round the chain or like wheel which is operated by the telegraph transmitter operated by the commander or other.

The invention will be further described with reference to the accompanying drawings, which illustrate it.

Figure 4:
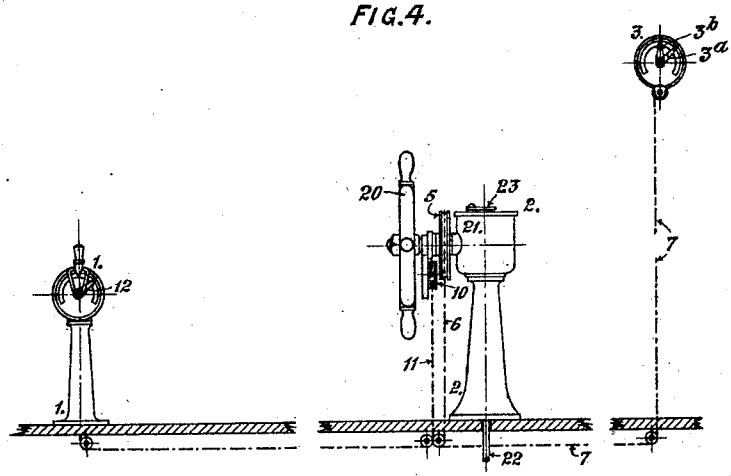

In the drawings, Figure 1 is a front elevation of the quartermaster's apparatus by which the valve or controlling gear of the power steering gear is operated; Figure 2 is a sectional elevation of same; and Figure 3 is an outside elevation with a part of the protecting frame hereinafter described, broken away. Figure 4 is a side elevation showing in diagram the whole installation of telegraphic and steering mechanism.

Referring to the drawings, 1 generally represents the transmitting instrument which is operated by the commander or other, 2 is the quartermaster's steering engine controlling gear instrument, and 3 is the indicator or receiving instrument operated from the transmitter 1, which indicates the orders which the quartermaster has to carry out by the operation of the instrument 2; this instrument being suitably disposed relatively to the instrument 2.

The wheel 5 of the pawl actuating mechanism of the instrument 2 is operated from the transmitter 1—say through a chain as indicated by the dot and dash lines in Figure 4; and the part of this chain which passes up over the wheel 5 is designated 6; and the indicating instrument 3 is also similarly operated from the transmitter 1 by chain or the like, the part leading to the instrument being designated 7, which actuates a pointer 3ª.

The reply or tell-tale indication to the commander from the actual operation of the instrument 2 by the quartermaster, is effected by a wheel 10 operated by the mechanism of instrument 2 as hereinafter described, through a chain 11, which passes to the instrument 1, and operates a tell-tale pointer 12, so that it will show exactly the actual operations of the wheel of the instrument 2, and thereby the steering gear.

The operation of the instrument 2 by the quartermaster also actuates a pointer or indicator 3ᵇ in the instrument 3, such pointer being moved by a connecting chain similar to 7 from the wheel 10.

It will be understood that in all cases instead of chains or cords being used to transmit motion from instrument to instrument, rods, rotary shafting and gear wheels, or the like, may be employed.

With regard to the locking means or mechanism operated by the wheel 2, and the operation of the reply or tell-tale mechanism and its operating wheel 10, these will be now described with reference mainly to Figures 1 to 3.

The hub of the wheel 5 is mounted freely by a ball bearing on the sleeve bearing 13 as shown, which is formed on the inside of plate 14, which connects two members of a supporting stand or frame 15, which extends up from the base, and also over the wheel 5, an open space being formed in this frame between edge of the plate 14 and the lower inner edge of the angle frame 15. Thus the wheel 5 can be revolved freely round its bearing 13 by its chain.

The notched or tooth wheel is designated 17, and is mounted and fixed in the case shown, on the hand wheel operating shaft 18 by a pin 19; and the boss of this wheel 17 passes through the bearing 13 as seen, and the hand wheel proper 20, is mounted on the outer end of the shaft 18 which passes into the interior of the head 21 of the instrument 2, and operates the steering gear valve actuating or controlling mechanism through say a rotary shaft 22, which extends to the valve gear of the steering engine or machine in the known way; and the operation of this gear and degree of its motion can be indicated upon a dial on the upper face plate of the head 21, over which a pointer 23 moves, it being actuated by the gear within 21 in the known way; this indication being in addition to the indication by the pointer 3ª before described.

The pawls which operate in connection with the notched wheel 17 are designated 24, and are mounted on spindles 25 fixed on the plate 14, and they are normally pressed towards the notched wheel by springs 26.

The noses 27 of the pawls 24 are permitted to enter the notches of the wheel 17 (see right hand of Figure 1) or are held out of these notches, by a cam 28, which may be cast on or attached to the arms of the wheel 5.

When an order is transmitted to the instrument 2, and it is required that the wheel 20 should be turned to the right hand, after it having been turned to the left and the cam 28 stands in the position shown in Figure 1, the inclined end of the cam will act on the roller 30 of the right hand pawl, and lift this pawl nose out of the notched wheel, thus freeing the notched wheel, which being fixed on the shaft 18 enables this shaft to be turned by the hand wheel 20, and the valve or controlling mechanism of the steering gear to be operated in one direction, namely, in the right direction according to the order transmitted to the quartermaster.

The means of actuating the tell-tale pointer 12 of the transmitter 1, through the wheel 10 and chain 11, consists of a pin 32 on the face of the notched wheel 17 which operates a notched wheel 33 once every revolution of the wheel 17; this notch wheel 33 being carried on a screw pin 34 supported at one end in the plate 14, into which it is screwed, and at the other in a plate 35, which is secured in position by this pin 34 and screws 36 screwed into the ends of the pins 25 which support the pawls 24; the wheel 10 itself being fixed to the wheel 33.

Thus the tell-tale pointer 12 is moved intermittently by this pin 32 and notched wheel 33; and between these movements by the pin 32, the notch wheel 33 will be held by the disc 37 fixed or formed on the face of the wheel 17, the periphery of the disc lying within the concave contact faces 38 of the parts of the wheel 33 between the notches.

In case it is desired to hold the pawls 24 out of engagement with the notch wheel 17, or either of them, this can be effected by means of the hand pawl levers 40 carried by pins from the frame or casing 15, the short or inner arms of which act on projections 41 on the pawls, whereby when a lever 40 is moved up by its handle into the upper position, the ends of this lever acting on the part 41, will move the pawl 24 outwards and free it from the wheel 17; and owing to the shape of the hand levers 46 and the position of these parts relatively to their pivots, and pawl projections 41, the pawls 24 will be held in this position to which they have been so moved. The limit of movement of the hand levers 40 is effected by stops 42.

In some cases the indicator or pointer operated by the telegraph transmitter 1, and the indicator or pointer operated by the wheel 20 and instrument 21, may be directly mounted on or combined with the latter instrument, so as practically to be in one therewith; and in such a case, as in the case shown in the drawings, one of the pointers or indicators would be moved by the transmitter 1, when operated, and the other would be moved by the mechanism of the instrument 21 when the handle 20 is operated.

What is claimed is:—

1. A ship's safety steering apparatus comprising in combination, a telegraph transmitting instrument, a reply indicator connected therewith, a hand operated steering machinery controlling instrument comprising means operated by the transmitting instrument for automatically locking and preventing the controlling instrument from being operated in one direction, and allowing it to be operated in the other direction at will, according to the operation of the transmitting instrument, an indicator connected with the controlling instrument adapted to be operated by the transmitting instrument, and an indicator connected with the said controlling instrument adapted to be operated by the latter, motion transmission means between the transmitting instrument and the controlling instrument and its indicator, and motion transmission means between the controlling instrument, and the indicator connected therewith; substantially as set forth.

2. In safety steering apparatus, the combination in the hand operated instrument which controls or actuates the rudder operating engine or machine, of a wheel operated by the steering telegraph transmitting instrument, a cam on said wheel, a notched wheel on the shaft of the hand operated instrument, and pawls adapted to operate alternately in connection with the notched wheel, and to be operated alternately according to the direction of motion of the cam wheel and cam; substantially as set forth.

3. Safety steering apparatus comprising a steering telegraph instrument, a hand operated mechanism for actuating or controlling the steering engine or machine and comprising a hand wheel, a notched wheel and pawls, pawl operating means on a wheel connected by suitable connections and operated from the transmitting instrument, and means operated by the hand wheel connected with and adapted to operate an indicator device; substantially as set forth.

4. In a safety steering apparatus, the combination of a hand wheel 20, a shaft 18 on which it is mounted, a wheel 5 loosely mounted on said shaft, a cam 28 on such wheel, a notched wheel 17 fixed on the shaft 18, and pawls 24 operating in connection with and controlling the movement of the notched wheel, and adapted to be operated by the said cam; substantially as set forth.

5. In a safety steering apparatus, the combination of a hand wheel 20, a shaft 18 on which it is mounted, a wheel 5 loosely mounted on said shaft, a cam 28 on such wheel, a notched wheel 17 fixed on the hand wheel shaft 18, pawls 24 operating in connection with and controlling the movement of the notched wheel a notched wheel 33 having concave faced portions 38 and notches between them, a disc wheel 37 and tooth 32 revolving with the axle 18, and adapted to operate respectively in connection with the concave portions 38 of the wheel 33, and the notches between these parts 38; and a wheel 10 connected with and revolved by the wheel 33; substantially as set forth.

6. In a safety steering apparatus, the combination of a hand wheel 20 mounted on a shaft 18, a wheel 5 loosely mounted on said shaft, a cam 28 on such wheel, a notched wheel 17 fixed on the hand wheel shaft 18, pawls 24 operating in connection with and controlling the movement of the notched wheel, and a supporting frame 15 supporting the pawls 24, and extending over the wheel 5 substantially as set forth.

In testimony whereof I have signed my name to this specification in the presence of two subscribing witnesses.

JAMES RICHARD CLAY.

Witnesses:
CLIFFORD LAYTON,
SHELAGH DONALDSON.